United States Patent [19]

Kimura

[11] Patent Number: 4,517,611
[45] Date of Patent: May 14, 1985

[54] VIDEO RECORDING SYSTEM

[75] Inventor: Kenji Kimura, Tachikawa, Japan

[73] Assignee: Olumpus Optical Company Limited, Japan

[21] Appl. No.: 388,598

[22] Filed: Jun. 15, 1982

[30] Foreign Application Priority Data

Jun. 18, 1981 [JP] Japan .................. 56-94514

[51] Int. Cl.³ .................................... H04N 5/782
[52] U.S. Cl. .................. 360/33.1; 360/73; 360/74.1; 360/14.1; 360/60; 360/35.1
[58] Field of Search .............. 358/335, 906, 213; 360/33.1, 73, 74.1, 62, 14.1, 14.2, 14.3, 60, 35.1, 71; 369/47, 48

[56] References Cited

U.S. PATENT DOCUMENTS

| 3,588,376 | 6/1971 | Jeske | 369/47 |
| 3,890,639 | 6/1975 | O'Donnell | 360/62 |
| 3,974,522 | 8/1976 | Fukatsu | 360/60 |
| 4,131,919 | 12/1978 | Lloyd | 358/906 |
| 4,163,256 | 7/1979 | Adcock | 358/906 |

OTHER PUBLICATIONS

Japanese Pat. Appln. Laid-Open Publication No. 95117/79, published Jul. 27, 1979; Applicant: Tokyo Shibaura Electric Company Ltd.
Japanese Pat. Appln. Laid-Open Publication No. 52347/73, published: Jul. 23, 1973; Applicant: Nippon Electric Company Limited, Tokyo, Japan.

Primary Examiner—Alan Faber
Attorney, Agent, or Firm—Parkhurst & Oliff

[57] ABSTRACT

A system for recording a video signal derived from a solid state image sensing device including a number of picture cells is disclosed. The video signal is read-out of the solid state image sensing device and is recorded on a magnetic tape of a video tape recording device. When a shutter release button is pushed, the magnetic tape is rewound by a given length and then the magnetic tape is traveled forward. During the forward movement of the magnetic tape, the video tape recording device is set into a reproduction mode and the video signal which has been previously recorded is reproduced. As soon as the video signal is not detected from the magnetic tape, the video tape recording device is changed into a record mode and after a given servo lock time, a shutter is opened for a given period. Immediately after the shutter is closed again, the video signal is read-out of the solid state image sensing device and then is recorded on the magnetic tape which is traveled at a given constant speed.

7 Claims, 16 Drawing Figures

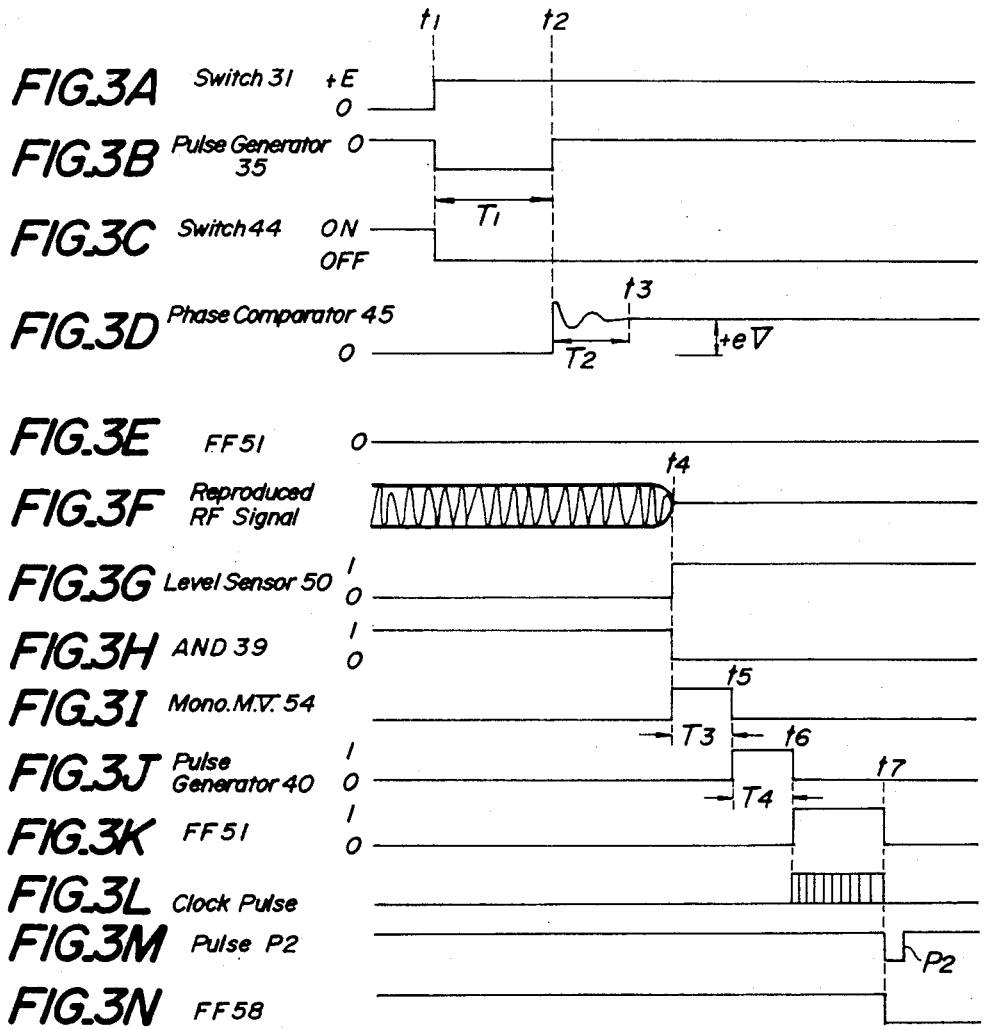

VIDEO RECORDING SYSTEM

BACKGROUND OF THE INVENTION

The present invention relates to a video recording system comprising a solid state image sensing device and a video tape recording device, and more particularly to a video recording system for recording a video signal having a high resolution such as more than 1,000 horizontal scanning lines per frame on a magnetic tape.

In a solid state image sensing device for deriving a video signal of a high resolution it is necessary to increase the number of picture elements and therefore, the number of image sensing cells is naturally increased. It should be noted that an image sensing cell means a unit of a photoelectric converting element for producing a photoelectrically converted signal representing brightness information of a picture element. As is well known in the semiconductor field, there have been developed various types of solid state image sensing devices such as a charge transfer device including a charge coupled device (CCD) and a bucket brigade device (BBD), in which the brightness information is read out by transferring a mass of charges generated in response to impinging light, and an X-Y photodiode matrix device in which each cell is coupled with an analog gate formed by a MOS transistor with the brightness information being read out by deriving via the analog gate a mass of charges generated in a relevant cell in response to incident light.

In the above mentioned solid state image sensing device, the charges stored in each cell is discharged and a video signal representing the brightness information is derived by detecting a magnitude of a discharge current. Therefore, it requires a relatively long time for deriving the video signal from each cell. For instance, if the read-out time for a single cell is one micro second and the image sensing device comprises 1,000×1,000 cells, it takes $1\ \mu s \times 10^6 = 1$ second for deriving the video signal representing a single frame. That is to say, there is produced a time difference of one second between a timing at which a first picture element is read out and a timing at which a last picture element is read out.

In the solid state image sensing device, an amount of stored charges is substantially proportional to a time during which light is made incident and thus, a very large difference in sensitivity is produced between respective cells and the quality of a reproduced image might be damaged to a great extent. In an extreme case, the charge might be saturated during the read-out operation and a correct video signal may not be obtained. In order to obviate such a drawback, it has been proposed to provide a mechanical shutter to shield an irradiation of the image sensing device during the read-out period. That is to say, an exposure time is controlled in accordance with an amount of stored charges in respective cells in such a manner that the charges do not saturate.

In a video tape recording device for recording a video signal derived from a video camera comprising the solid state image sensing device and a mechanical shutter, it is required that a magnetic tape travel continuously at a given constant speed, otherwise a desired scene could not be recorded accurately, because the shutter is manually actuated at random timings. Therefore, the video signal is recorded on a very small part of the magnetic tape and the magnetic tape is not utilized efficiently and there remain a large amount of tape portions on which no video signal is recorded.

SUMMARY OF THE INVENTION

The present invention has for its object to provide a video recording system comprising a solid state image sensing device and a video tape recording device, which system can avoid the drawbacks of the known systems and can utilize a magnetic tape in an efficient manner, by making the amount of wasted tape portions as small as possible.

It is another object of the invention to provide a video recording system in which a video signal of a frame can be recorded along a track on a magnetic tape which track is adjacent to a previously recorded track.

According to the invention, a video recording system comprises a solid state image sensing device having a number of cells, an optical system for projecting an image of an object to be recorded onto the solid state image sensing device, a shutter means for shielding the solid state image sensing device against the projection of the object image for a read-out period during which charges stored in respective cells are successively read-out to derive a video signal, a video tape recording device for recording the video signal on a magnetic tape traveling at a given constant speed, and a control means for controlling in response to a record start signal said solid state image sensing device, shutter means and video tape recording device in such a manner that the magnetic tape which has been in a stationary condition travels at the given constant speed and then the derived video signal is recorded on the magnetic tape.

DESCRIPTION OF THE DRAWINGS

FIGS. 3A to 3N are signal waveforms for explaining an operation of the video recording system in FIG 2.

DESCRIPTION OF THE PREFERRED EMBODIMENTS

Figure 1:
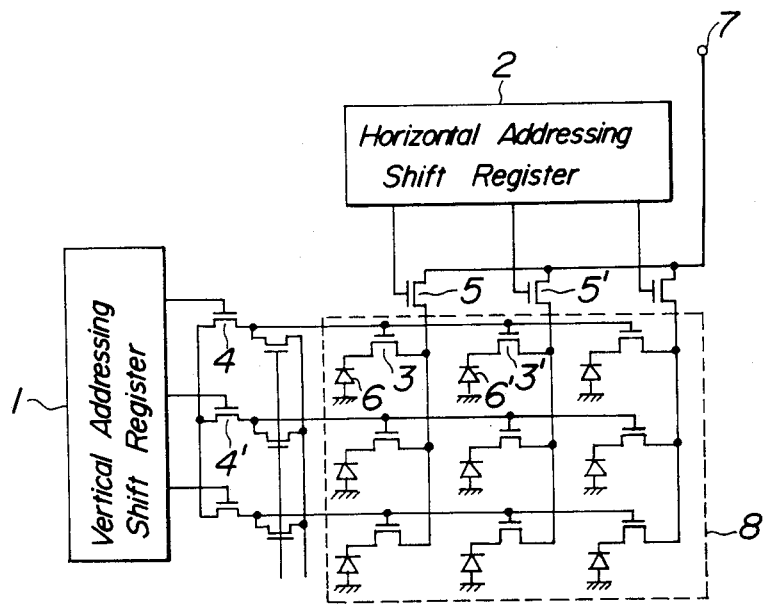
FIG. 1 is a circuit diagram showing an embodiment of a known solid state image sensing device.

FIG. 1 is a circuit diagram showing an embodiment of a known solid state image sensing device which is preferably utilized in the video recording system according to the invention. The present image sensing device comprises a number of photodiodes 6, 6', ..., i.e. cells, arranged in a matrix form, a vertical addressing shift register 1 having a number of stages (bits) equal to the number of horizontal scanning lines, i.e. the number of vertically arranged cells and a horizontal addressing shift register 2 having a number of stages (bits) equal to the number of horizontally arranged cells. At each of the cross points of the output lines of the vertical and horizontal addressing shift registers 1 and 2 are arranged respective vertical MOS gates 3, 3', ... to which are supplied vertical and horizontal scanning pulses from the vertical and horizontal addressing shift registers 1 and 2, respectively via vertical buffers 4, 4', ... and horizontal MOS gates 5, 5', ..., respectively. When a vertical MOS gate, for instance a vertical MOS gate 3, is made conductive by supplying thereto simultaneously both the vertical and horizontal scanning pulses via the vertical buffer 4 and horizontal MOS gate 5, respectively, the photodiode 6 connected to the relevant vertical MOS gate 3 is selected and a mass of charges stored in this selected photodiode 6 is read out as a video signal which appears at an output terminal 7. It should be noted that a portion enclosed by a dotted block represents a light receiving section 8 and a pair of respective photodiodes 6, 6', ... and respective vertical MOS gates 3, 3' ... connected thereto constitutes a unit cell, i.e. a picture element.

Figure 2:
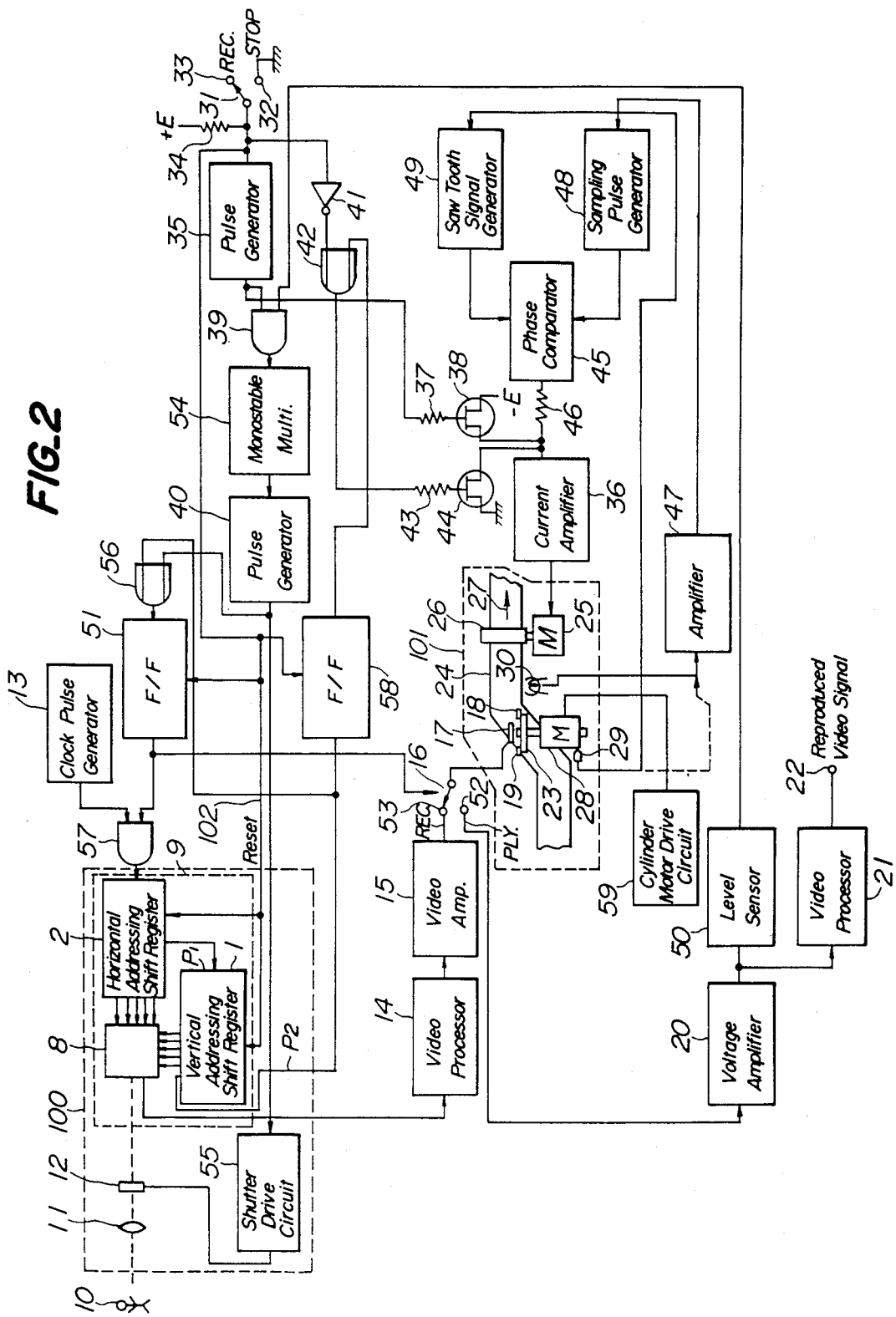
FIG. 2 is a block diagram illustrating an embodiment of the video recording system according to the invention.

FIG. 2 is a block diagram showing an embodiment of the video recording system according to the invention. The system comprises a video camera unit 100 including a solid state image sensing device 9 having a light receiving section 8 shown in FIG. 1, an imaging lens 11 and a shutter 12. An image of an object 10 is formed by the lens 11 onto the light receiving section 8 which is scanned by vertical and horizontal addressing shift register 1 and 2 as explained above with reference to FIG. 1. The system further comprises a recording head 101 of a two-head helical scan type video tape recorder. The recording head 101 comprises two magnetic heads 18 and 19 secured to a rotary cylinder 23 diagonally. A magnetic tape 24 is traveled in a direction 27 at a given speed by means of a capstan 26 coupled with a capstan motor 25. The rotary cylinder 23 is driven by a cylinder motor 28 a rotation speed of which is detected by a detection head 29 to produce a pulse for each revolution of the cylinder 23. The magnetic tape 24 has a control signal recorded along a control track and the control track signal is reproduced by a control track head 30.

As explained in FIG. 1, the vertical MOS gates 3, 3', ... of respective cells of the light receiving section 8 are coupled with the vertical and horizontal addressing shift registers 1 and 2. In the present embodiment, since the image sensing device 9 comprises 1,000×1,000 cells, the vertical and horizontal addressing shift registers must have 1,000 stages, respectively. The horizontal addressing shift register 2 is driven by clock pulses generated from a clock pulse generator 13. The horizontal addressing shift register 2 makes conductive the successive vertical MOS gates 3, 3', ... aligned in a horizontal line to read out the video signal of one line. Then, the shift register 2 produces an overflow pulse $P_1$ which is then supplied to the vertical addressing shift register 1 to shift its state by one stage. In this manner 1,000 cells of a next scanning line are successively read out. When all of the cells of all scanning lines are read out, the vertical addressing shift register 1 arrives at a full count to produce an overflow pulse $P_2$. In other words, a generation of the overflow pulse $P_2$ represents a completion of the read-out operation for all of 1,000×1,000 cells in the light receiving section 8. The vertical and horizontal addressing shift registers 1 and 2 are simultaneously reset by a reset signal supplied via a common reset line 102 as will be explained later. When these shift registers 1 and 2 are reset, they are forcedly driven into an initial condition and are held in this condition until the reset is released.

The output signal serially read-out of the solid state image sensing device 9 is supplied to a video signal processor 14 for effecting a so-called γ-correction and an addition of synchronizing signals and is converted into a video signal which is then supplied via a recording video amplifier 15, a record contact 53 of an electronic switch 16 and a rotary transformer 17 to the video heads 18 and 19. In general, the video signal is frequency modulated and a frequency modulated RF signal is recorded on the magnetic tape 24. To this end the video amplifier 15 includes a frequency modulator.

In a reproduction mode, the switch 16 is driven into a reproducing contact 52 and the frequency modulated RF signal picked-up by the video heads 18 and 19 is amplified by a voltage amplifier 20 and is processed by a video signal processor 21 to derive a reproduced video signal at an output terminal 22. It should be noted that the video signal processor 21 includes a frequency demodulator. The reproduced video signal may be supplied to a video monitor to display an image of the object 10.

The system further comprises a manual switch 31 shown in a right upper corner of the drawing of FIG. 2 and the switch 31 is coupled with a shutter release button. When the shutter release button is actuated, the switch is driven from a stop contact 32 into a record contact 33. As shown in FIG. 3A, when the switch 31 is driven into the record contact 31 at a time $t_1$, an output of the switch becomes a high level from 0 volt, because its switching arm is connected to a voltage supply source $+E$ through a resistor 34. Then a pulse generator 35 is triggered by a rising edge of the switch output to produce an output pulse having a given duration $T_1$ as illustrated in FIG. 3B. As will be explained later, this output pulse is used to drive the video tape recorder head 101 into a rewind mode. This is due to the fact that a lock-in time of a capstan servo system, i.e. a servo lock time of the capstan servo system is about one second and thus, the magnetic tape 24 must be previously rewound by an amount corresponding to about two seconds of travel.

In the video tape recording head 101 of the present embodiment, the magnetic tape 24 is subjected to equal tensions in both forward and backward directions with respect to the rotary cylinder 23. Therefore, the magnetic tape 24 can be rewound by reversing the rotational direction of the capstan motor 25. The tension may be produced by applying to tape supply and tape wind reels rotational forces in opposite directions. Since such a tension mechanism is well known in the art, it is not shown in the drawing.

The capstan motor 25 is driven by a current amplifier 36 and when an input voltage to the current amplifier 36 is zero volts (earth potential), the capstan motor 25 is stopped, and when the input voltage is negative voltage $-E$ or positive voltage $+e$, the capstan motor 25 is driven in backward or forward direction to effect the rewinding or recording/reproducing.

When the output pulse from the pulse generator 35 is applied via a resistor 37 to a gate of a field effect type semiconductor switch 38, a negative voltage of $-E$ volt is applied to the current amplifier 36 by means of the semiconductor switch 38 and the capstan motor 25 is driven in the reverse direction for the period $T_1$ to rewind the magnetic tape 24 by a predetermined length. At the same time, the output pulse from the pulse generator 35 is supplied via an AND gate circuit 39 to a second pulse generator 40 to trigger the latter.

The output of the switch 32 is also applied to a field effect type semiconductor switch 44 by means of an inverter 41, an OR gate 42 and a resistor 43 to turn off the switch 44 at the time $t_1$ as illustrated in FIG. 3C. Therefore, as soon as the rewinding operation is completed at a time $t_2$, an output voltage from a phase comparator 45 is applied via a resistor 46 to the current amplifier 36 and the capstan motor 25 is entered into the servo control condition.

Now the servo control of the capstan motor 25 will be explained. The control track signal recorded on the control track of the magnetic tape 24 is picked-up by a control track head 30 and the control track signal thus reproduced is amplified by an amplifier 47. The amplified control track signal is supplied to a sampling pulse generator 48 to produce a sampling pulse which is supplied to one input of the phase comparator 45. To the other input of the phase comparator 45 is supplied a sawtooth signal derived from a sawtooth signal generator 49 which is triggered by the output pulse of the detection head 29 for detecting the rotation of the rotary cylinder 23. In case of recording the control track signal on the magnetic tape 24, the output pulse from the detection head 29 is supplied to the control track head 30. The cylinder 23 is rotated at a frequency of 30 Hz and thus, the output pulse from the head 29 has also a frequency of 30 Hz. In this manner, during the recording operation, the output pulse from the detectio head 29 is applied to the amplifier 47 as shown by a dotted line in FIG. 2 and therefore, the capstan motor 25 is driven in synchronism with the rotation of the cylinder 23 and the tape 24 travels at a given constant speed.

As soon as the rewinding operation having the duration $T_1$ is completed at the time $t_2$, the capstan motor 25 is controlled by a feedback loop consisting of the control track head 30, amplifier 47, sampling pulse generator 48, sawtooth signal generator 49, phase comparator 45 and amplifier 36. As the result thereof, the magnetic tape 24 is fed forwardly in synchronism with the rotating frequency of the rotary cylinder 23 and thus is subjected to the entirely same condition as that under which the control track signal was recorded.

The output signal of the phase comparator 45 shown in FIG. 3D represents a capstan servo error and is held at a time $t_3$ to a servo lock voltage of $+e$ volts after a servo lock period $T_2$, which is usually shorter than one second has elapsed.

The output of the pulse generator 35 triggered by the rising edge of the output signal of the switch 31 is applied to one input of the AND gate circuit 39 to the other input of which is applied an output of a level sensor 50. The level sensor 50 receives the reproduced RF signal picked-up by the video heads 18 and 19, and amplified by the voltage amplifier 20 and compares the received RF signal with a predetermined threshold level to produce a detection signal when the video signal becomes lower than the threshold level. Therefore, as long as the reproduced RF signal is existent, the AND gate circuit 39 is enabled. The output of the switch 31 is also used to reset a flip-flop 51 whose Q output is coupled with the electronic switch 16. That is to say, when the flip-flop 52 is reset by driving the switch 31 into the stop contact 32, its Q output becomes a "0" level as shown in FIG. 3E and the switch 16 is driven into the reproduced contact 52. Contrary to this, when the flip-flop 51 is set by an output of an OR gate 56, the Q output becomes "1" level and the switch 16 is driven into the record contact 53.

When the video heads 18 and 19 scan a part of the magnetic tape 24 on which the video signal is not recorded, the reproduced RF signal a "0" level at a time $t_4$ as illustrated in FIG. 3F and the level sensor 50 produces a detection signal of a "1" level as shown in FIG. 3G. Then the detection signal enables the AND gate circuit 39 which then produces an output pulse of a "0" level as depicted in FIG. 3H. It should be noted that the output of the pulse generator 35 remains at a "0" level except for the period $T_1$.

Then a monostable multivibrator 54 is triggered by the output signal from the AND gate circuit 39 at the time $t_4$ to produce a pulse having a duration of $T_3$ which is nearly equal to one second. The pulse generator 40 is triggered by a trailing edge of the output pulse from the multivibrator 54 at a time $t_5$ to produce an output pulse having a duration $T_4$ equal to 1/30 second as shown in FIG. 3J. It should be noted that in the waveforms the durations of the output pulses are not exactly illustrated for the sake of clearness. This output pulse from the pulse generator 40 is supplied to a shutter drive circuit 55 to open the shutter 12 for 1/30 second. In this manner, the object image is projected upon the light receiving section 8 of the solid state image sensing device 9 for 1/30 second and each of the cells of the light receiving section 8 store charges, the amounts of which are proportional to luminous intensities of light rays impinging upon respective cells.

The output pulse from the pulse generator 40 is supplied through the OR gate circuit 56 to the flip-flop 51 which is set by a trailing edge of the output pulse at a time $t_6$. At this time $t_6$, the shutter 12 is closed again. Then, the Q output of the flip-flop 51 becomes a "1" level at the time $t_6$ as shown in FIG. 3K, which output of "1" level is supplied to one input of an AND gate circuit 57 to the other input of which are supplied clock pulses generated from the clock pulse generator 13. Then the clock pulses are supplied to the horizontal addressing shift register 2 as illustrated in FIG. 3L. At the same time, the switch 16 is changed into the record contact 53 at the time $t_6$. In this manner, the video signal successively read out of the image sensing device 9 is recorded on the magnetic tape 24 by means of the video heads 18 and 19.

When all the cells are scanned and read out, the overflow pulse $P_2$ is produced from the vertical addressing shift register 1 at a time $t_7$ as shown in FIG. 3M and this pulse $P_2$ is supplied via the OR gate circuit 56 to the flip-flop 51 to reset the latter. Then, the Q output of the flip-flop 51 is changed into a "0" level as illustrated in FIG. 3K. Then, the switch 16 is driven into the reproduction contact 52. At the same time, the overflow pulse $P_2$ in FIG. 3M is supplied to a flip-flop 58 to trigger the latter. An output signal from the flip-flop 58 shown in FIG. 3N is supplied through the OR gate 42 and resistor 43 to the semiconductor switch 44 to make it conductive. Therefore, the input of the current amplifier 36 is connected to the earth potential and thus, the capstan motor 25 is deenergized. In this manner, the traveling of the magnetic tape 24 is stopped. After that, the switch 31 is manually driven into the stop contact 32 to prepare for a next shot. Then, the output of the switch 31 is changed from a "1" level to a "0" level and thus, the vertical and horizontal addressing shift registers 1 and 2 and the flip-flops 51 and 58 are all reset into the initial condition via the reset line 102. It should be noted that the cylinder motor 28 is driven by a cylinder motor drive circuit 59 which is energized as long as a main switch (not shown) is on.

In the present embodiment, the shutter driving pulse shown in FIG. 3J is delayed by the monostable multivibrator 54 for the period $T_3$ of about one second. If the monostable multivibrator 54 is omitted, the following inconvenience might occur. If the RF signal is not recorded on the tape 24 when the rewinding mode is changed into the reproduction mode at the time $t_2$, the level sensor 50 will immediately produce the output signal of a "1" level and the pulse generator 40 will produce the output pulse of 1/30 second. Therefore, the video signal might be read out after the image exposure of 1/30 second and at this time, the capstan motor 25 will not be servo locked yet and thus, the magnetic tape 24 will not be traveling at the given constant speed. In other words, the period $T_4$ of 1/30 second is too short to bring the magnetic tape 24 from the stationary condition to the normal traveling condition. Therefore, in the above embodiment, the monostable multivibrator 54 is provided to delay the shutter driving pulse by the sufficient time $T_3$ during which the magnetic tape 24 can attain the given constant speed.

The present invention is not limited to the embodiment explained above, but many modifications can be conceived by those skilled in the art within the scope of the invention. For instance, in the above embodiment, before the video signal is recorded on the magnetic tape, the tape is first rewound by some length. However, it is not always necessary to do so, but the recording operation may be effected without the rewinding operation. For instance, the capstan motor 25 may be started upon the actuation of the manual switch 31 and the shutter 12 may be driven after the capstan motor 25 is servo locked. Then it is not necessary to detect the level of the reproduced RF signal and to delay the shutter driving signal. Therefore, the construction of the video recording system may be made such simpler. Also in such a simplified embodiment, the video signal can be recorded on the tape much more efficiently as compared with the known system in which the magnetic tape travels at the constant speed as long as the main switch is on.

What is claimed is:

1. In a video recording system including a solid state image sensing device having a number of cells, an optical system for projecting an image of an object to be recorded onto the solid state image sensing device, a shutter means for shielding said solid state image sensing device against the projection of the object image for a read-out period during which charges stored in respective cells are successively read-out to derive a video signal representing an image, a manual shutter release member constructed and arranged to be actuated by a user of the video recording system to provide an actuation signal, a video tape recording device including a magnetic tape moving means for moving a magnetic tape in a forward direction or in a rewinding direction and means for recording said derived video signal on a predetermined portion of said magnetic tape, and control means for controlling said solid state image sensing device, said shutter means, and said video tape recording device, the improvement in said control means comprising:

first timing signal generating means for issuing a first timing signal in response to said actuation signal;

rewind signal generating means responsive to said first timing signal for generating a rewind signal during a predetermined first time period immediately after receipt of said first timing signal, said magnetic tape moving means being responsive to said rewind signal for moving said magnetic tape in the rewinding direction during said first time period;

forward movement signal generating means responsive to the expiration of said first time period for generating a forward movement signal immediately after said first time period has terminated, said magnetic tape moving means being responsive to said forward movement signal for moving said magnetic tape in the forward direction at a given constant speed;

second timing signal generating means responsive to the termination of said first time period for generating a second timing signal immediately after said first time period has terminated;

detecting means coupled to detect the presence of a video signal recorded on said magnetic tape and for generating a third timing signal upon the detection of the absence of a video signal recorded on said magnetic tape;

fourth timing signal generating means responsive to the occurrence of both said second and third timing signals for generating a fourth timing signal following the receipt of both said second and third timing signals, said shutter means being responsive to said fourth timing signal to open said shutter for a predetermined second time period; and means responsive to said fourth timing signal for causing said successive read-out of the charges stored in the respective cells of said solid state imaging device to derive said video signal.

2. The video recording system of claim 1 wherein said control means further includes switching means for changing the operation of said video tape recording device in response to said fourth timing signal such that the mode of operation is changed from a reproduction mode to a recording mode immediately after said predetermined second time period has terminated to cause recording of said derived video signal on said magnetic tape moving in the forward direction at a given constant speed.

3. The vide recording system of claims 1 or 2 wherein said detecting means comprises comparison means for comparing a threshold level with an amplitude of a reproduced RF signal derived from said magnetic tape.

4. The video recording system of claims 1 or 2 wherein said fourth timing signal generating means includes a delay circuit for providing a delayed output of said fourth timing signal for a predetermined third time period during which said forward movement of said magnetic tape produced by said magnetic tape moving means reaches said given constant speed.

5. The video recording system of claim 4 wherein said fourth timing signal generating means further includes signal generating means responsive to said delayed output from said delay circuit for generating said fourth timing signal during a predetermined fourth time period corresponding to said second time period.

6. A video recording system comprising:

a solid state image sensing device having a number of cells;

an optical system for projecting an image of an object to be recorded onto the solid state image sensing device;

shutter means for shielding said solid state image sensing device against the projection of the object image for a read-out period during which charges stored in the respective cells are successively read-out to derive a video signal representing an image;

means responsive to user actuation of the video recording system for providing an actuation signal;

a video tape recording device including a magnetic tape moving means for moving a magnetic tape in a forward direction or in a rewind direction and means for recording said derived video signal on said magnetic tape; and control means responsive to said actuation signal for controlling said solid state image sensing device, said shutter means, and said video tape recording device in such a manner that, in response to said actuation signal, said magnetic tape moving means moves said magnetic tape in a rewind direction to rewind said magnetic tape a predetermined amount and thereafter moves said magnetic tape in a forward direction to achieve a given constant speed of the magnetic tape while said magnetic tape is sensed to detect the absence of a recorded video signal on said tape, said control means being responsive to the absence of a video signal recorded on said forward moving tape for causing said shutter to open for a predetermined time period and subsequently causing the read-out of the charges stored in said cells of said solid state image sensing device to cause recording of said derived video signal on said magnetic tape moving at said given constant speed in a portion of said magnetic tape immediately adjacent a previously recorded portion.

7. A video recording system comprising:

a solid state image sensing device having a number of cells;

an optical system for projecting an image of an object to be recorded onto the solid state image sensing device;

shutter means for shielding said solid state image sensing device against the projection of the object image for a read-out period during which charges stored in the respective cells are successively read-out to derive a video signal representing an image;

means responsive to user actuation of the video recording system for providing an actuation signal;

a video tape recording device including a magnetic tape moving means for moving a magnetic tape in a forward direction or in a rewind direction and means for recording said derived video signal on said magnetic tape at a predetermined portion; and control means responsive to said actuation signal for controlling said solid state image sensing device, said shutter means, and said video tape recording device in such a manner that, in response to said actuation signal, said magnetic tape moving means moves said magnetic tape in a rewind direction to rewind said magnetic tape to a position which includes at least a previously recorded tape portion and thereafter moves said magnetic tape in a forward direction to achieve a given constant speed of the magnetic tape while said magnetic tape is sensed to detect the absence of a recorded video signal on said tape, said control means being responsive to the absence of a video signal recorded on said forward moving tape for causing said shutter to open for a predetermined time period and subsequently causing the read-out of the charges stored in said cells of said solid state image sensing device to cause recording of said derived video signal on said magnetic tape moving at said given constant speed in a portion of said magnetic tape immediately adjacent said previously recorded portion.

* * * * *